W. L. & O. BLAND.
MOLDING MACHINE FOR RUBBER COMPOUND.
APPLICATION FILED SEPT. 23, 1911.
1,101,053.
Patented June 23, 1914.
5 SHEETS—SHEET 5.
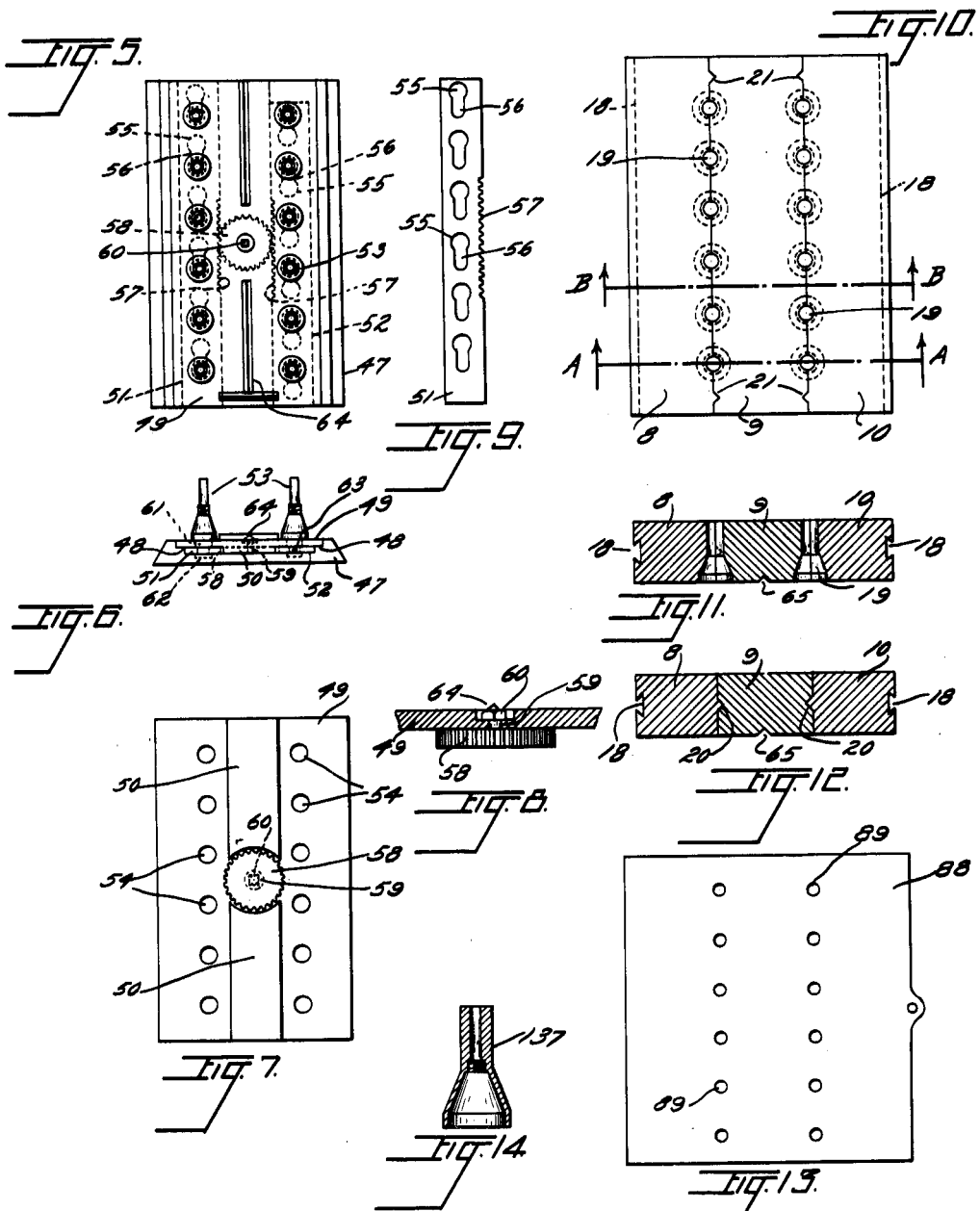
WITNESSES:
INVENTORS
Walter L. Bland
Otis Bland
BY
W. W. Withenbury
ATTORNEY ated June 23, 1914.
UNITED STATES PATENT OFFICE.

WALTER L. BLAND AND OTIS BLAND, OF CHICAGO, ILLINOIS; SAID WALTER L. BLAND ASSIGNOR TO SAID OTIS BLAND.

MOLDING-MACHINE FOR RUBBER COMPOUND.

1,101,053.

Specification of Letters Patent. Patented June 23, 1914.

Application filed September 23, 1911. Serial No. 650,932.

*To all whom it may concern:*

Be it known that we, WALTER L. BLAND and OTIS BLAND, citizens of the United States, and residing at Chicago, in the county of Cook and State of Illinois, have invented a new and useful Improvement in Molding-Machines for Rubber Compounds, of which the following is a complete specification.

The main objects of this invention are to provide an improved machine for molding rubber compound; to provide a machine adapted to mold rubber compound with great rapidity; to provide a machine adapted to mold rubber compound without flashing the material from the dies or molds and forming a flash rib on the article molded; to provide improved dies or molds and means for operating the same whereby seamless articles with perfectly finished surfaces may be produced; to provide a machine adapted to avoid the necessity in molding rubber compound of placing a piece or pieces of rubber in a two part mold and bringing the parts of the mold together on the rubber and causing the rubber to flash out between the mold parts and leave a rib which has to be subsequently removed; and to provide an automatic machine adapted to mold articles from rubber compound with a great saving of labor and material.

Figure 1:
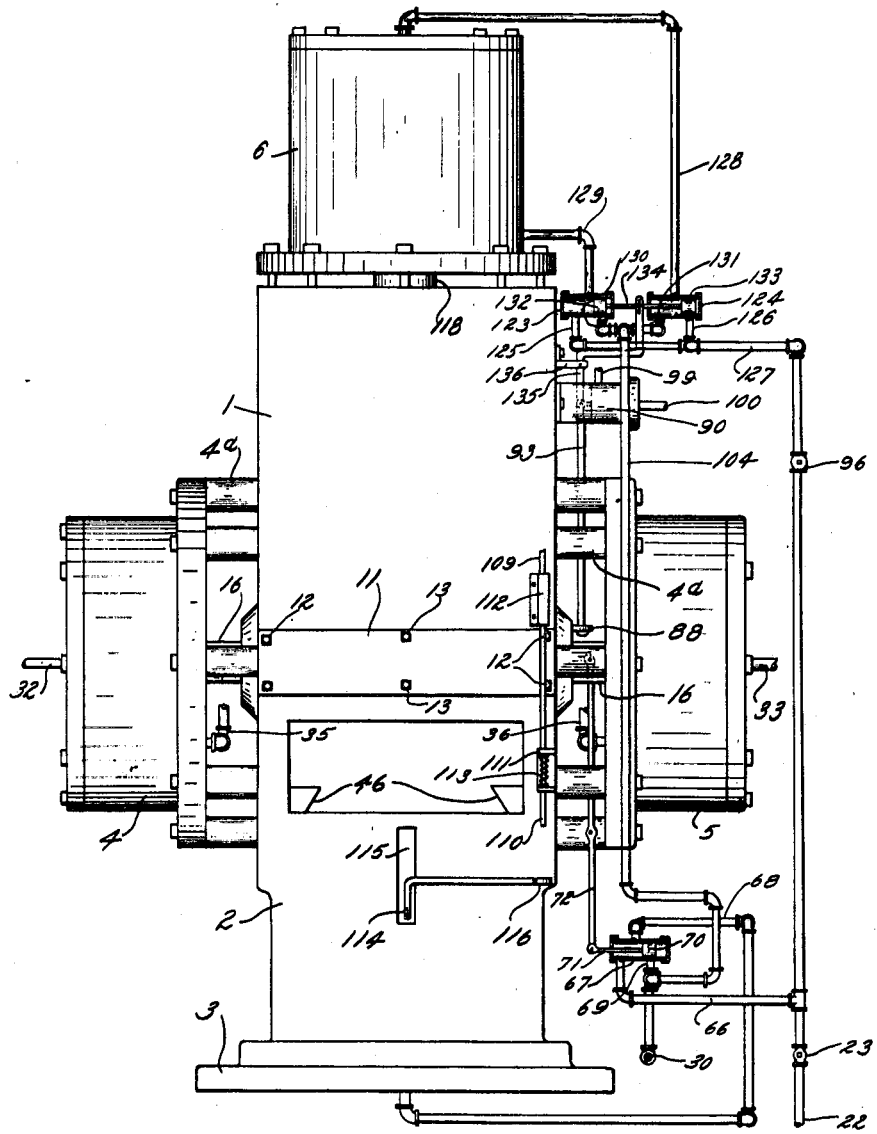
Figure 2:
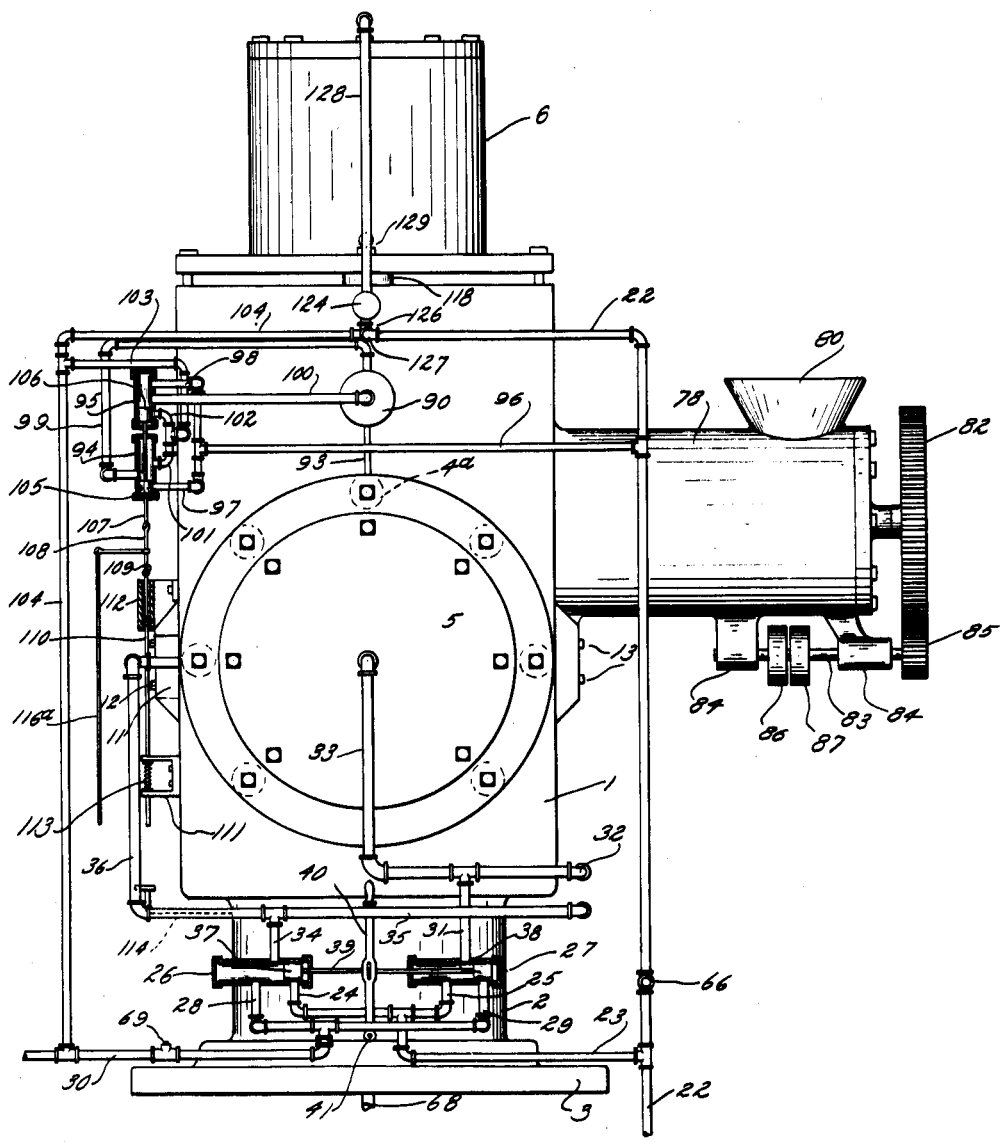
Figure 3:
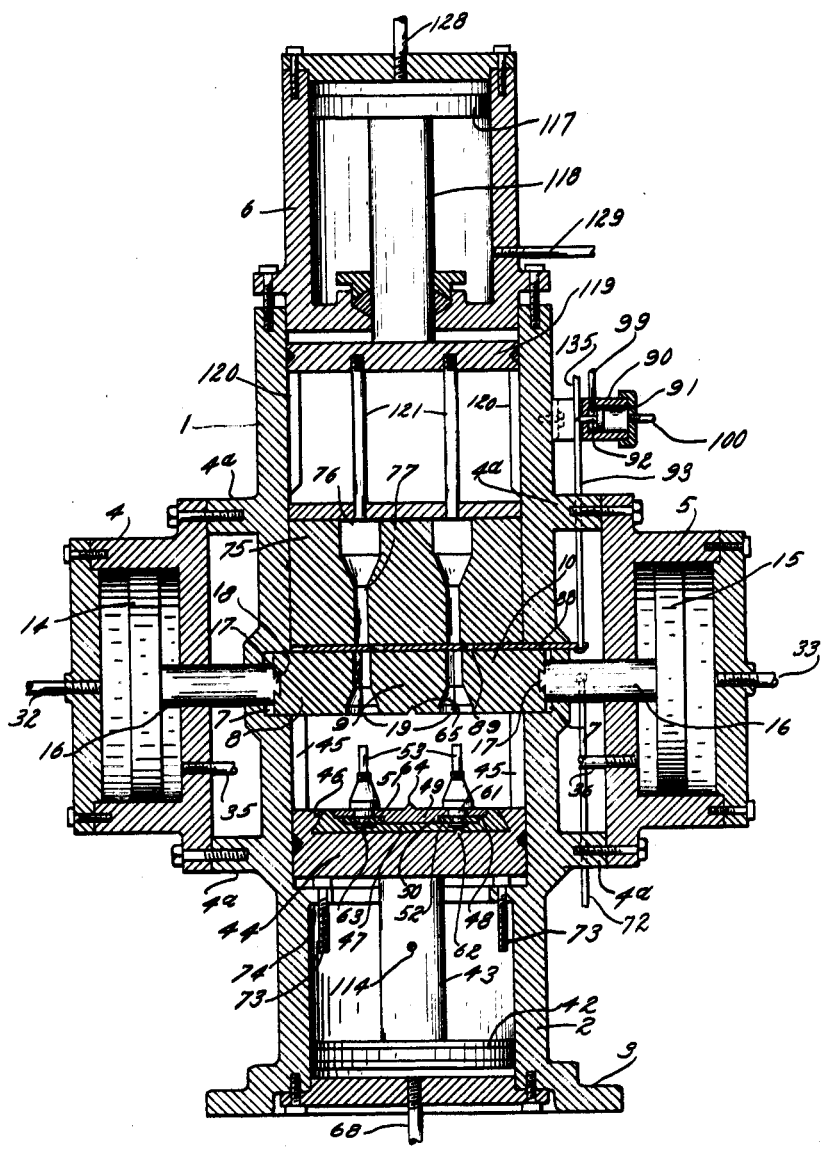
Figure 4:
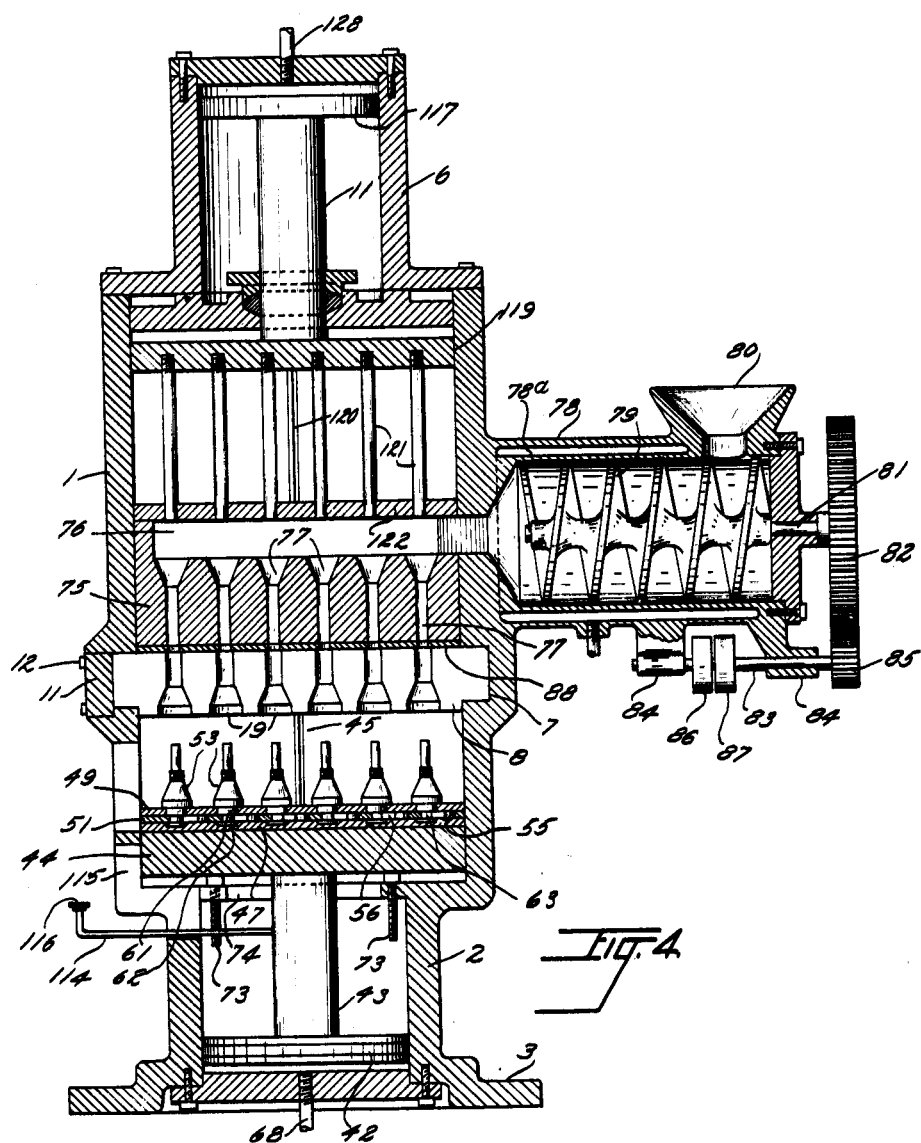

A specific embodiment of the invention is illustrated in the accompanying drawings, in which:

Figure 1 is an end elevation of a rubber compound molding machine embodied in this invention with the core plates and parts of the operating mechanism removed for clearness of illustration. Fig. 2 is a side elevation of the machine with parts of the operating mechanism removed. Fig. 3 is a vertical transverse section of the machine with parts in elevation. Fig. 4 is a vertical longitudinal section of the machine. Fig. 5 is a top plan view of the core plate. Fig. 6 is an end elevation of the core plate. Fig. 7 is a bottom plan view of the core plate cap. Fig. 8 is a fragmentary transverse section of the core plate cap. Fig. 9 is a top plan view of one of the locking bars for the cores. Fig. 10 is a top plan view of the sectional molds. Fig. 11 is a section taken on line A—A of Fig. 10. Fig. 12 is a section taken on line B—B of Fig. 10. Fig. 13 is a plan view of the mold valve plate. Fig. 14 is a longitudinal section of a telephone receiver molded in the machine.

In the construction shown, a central frame or casing 1 is provided on its bottom with a core operating cylinder 2 which is rigidly connected to and supported upon a base plate 3. Rigidly secured on studs or lugs 4ª, on the sides of the casing 1, are the mold operating cylinders 4 and 5, respectively, which are spaced a distance from the casing, and on the top of the casing is the compressing cylinder 6.

The casing 1 is provided in the inner surface of its side walls with a circumferential channel 7 in which the mold sections 8, 9 and 10 are mounted. At the front of the machine is an opening which opens into the channel 7 and is normally closed by a plate 11 which is secured at its ends to the casing by means of bolts 12. The central mold section 9 is rigidly bolted at its ends to the end of the casing and to the plate 11 by means of bolts 13 so that it is immovable with respect to the sections 8 and 10. In the cylinders 4 and 5 are pistons 14 and 15 respectively, the piston rods 16 of which project through the walls of the casing into the channel 7 and are provided on their inner ends with dove-tailed projections 17 adapted to fit in complemental grooves 18 in the outer edges of the sections 8 and 10. When the plate 11 is removed the mold sections may be withdrawn from the front of the casing. Formed in the meeting faces of the mold sections 8, 9 and 10 are the registering molds or mold cavities 19, which in the present instance are for the purpose of forming telephone receivers, though the machine may be employed to mold other articles of rubber compound by simply substituting the mold sections with ones having mold cavities therein adapted to form the articles desired. The mold sections 8 and 10 are provided on their inner edges with centering ribs 20 and 21 adapted to fit in complemental grooves in the section 9 to center the sections and always bring the parts of the mold into proper relation to each other.

For the purpose of moving the sections 8 and 10 to and from each other to close the molds preparatory to filling, or to open them to release the molded articles, fluid under pressure in the form of steam or compressed air is admitted to the cylinders 4 and 5. For this purpose a main pressure pipe 22 leads from a source of fluid under pressure, and a pipe 23 leads from the pipe 22 and is forked to provide branches 24 and 25 which open respectively into adjacent ends of alined valve cylinders 26 and 27. From the opposite ends of the cylinders 26 and 27 open pipes 28 and 29 respectively, which connect in an outlet or exhaust pipe 30. Leading from the cylinder 27 from a point between the pipes 25 and 29 is a pipe 31 which is branched to provide pipes 32 and 33 which open respectively into the outer ends of the mold operating cylinders 4 and 5. Leading from the cylinder 26, intermediate the pipes 24 and 28 is a pipe 34 which is provided with branch pipes 35 and 36 opening respectively into the inner ends of the mold operating cylinders 4 and 5. In the cylinders 26 and 27 are valve closures or pistons 37 and 38 respectively, which are connected by a piston rod 39. A lever 40 is pivoted at one end 41 to any suitable support and is connected with the piston rod 39, and is adapted to throw the valve closures or pistons 37 and 38 in either direction.

In the core operating cylinder 2 is a piston 42 which is provided with a piston rod 43 which extends upwardly into the casing 1 and is provided on its upper end with a core table 44 adapted to travel on guides 45 in the casing. Extending longitudinally of the table 44, in the top thereof, is a dovetailed groove 46 in which is slidably mounted the core plate 47 which is beveled on its lateral edges to fit the sides of the groove. The upper surface of the core plate is channeled and in the sides of the channel are shoulders 48 on which rest the edges of the core plate cap 49 which has its upper surface flush with the upper surface of the core plate.

The cap 49 is provided on its under surface with a central, longitudinal rib 50 which rests on the bottom of the channel in the core plate and provides a space on each side thereof in which are the locking bars 51 and 52 for the cores 53. The cap 49 is rigidly secured on the core plate 47 and is provided with a plurality of apertures 54 arranged in longitudinally disposed rows above the locking bars 51 and 52. The locking bars are provided with apertures 55 which, when the bars are in one position, are adapted to register with the apertures 54, and extending from each aperture 55, longitudinally of the bar, is a locking slot 56, of less width than the diameter of the aperture, the slots in one bar being directed oppositely from those in the other. Each locking bar is provided on its edge adjacent to the other bar with a rack 57 in which a pinion 58 meshes. The pinion 58 is countersunk in the rib 50 on the under side of the cap 49 and is rigidly secured on the stud bolt 59 which is journaled in the cap and is provided on its upper end with an angular head 60 by means of which the pinion may be rotated.

The cores 53 are of a shape to conform to the inner surface of the telephone receivers and are provided on their lower ends with fastening extensions 61 adapted to project through the apertures 54 and 55 and into recesses 62 in the core plate. Each extension 61 is provided with a peripheral groove 63 providing a reduced portion adapted to enter the slots 56.

The cores 53 are placed in the core plate while the plate is removed from the table 44 and when the apertures 55 are in register with the apertures 54. The pinion 58 is then rotated in a direction to move the bars 51 and 52 longitudinally and move the slots 56 on to the reduced portion formed by the grooves 63 in the extensions 61 and thereby lock the cores in place.

The cores 53 are so arranged on the core plate that when the plate is in position on the table 44 they will register with and enter the mold cavities 19 when the table is raised. For the purpose of truly centering the cores with respect to the molds the core plate cap is provided with a longitudinal and transverse rib 64 adapted to enter a complemental groove 65 in the mold section 9.

For the purpose of operating the piston 42 to move the cores 53 into and out of the molds 19 a pipe 66 leads from the pipe 22 and opens into one end of the valve cylinder 67. A pipe 68 leads from the central portion of the cylinder 67 and opens into the cylinder 2 beneath the piston 42. An outlet pipe 69 leads from the other end of the cylinder 67 and opens into the exhaust pipe 30. In the valve cylinder 67 is a valve closure or piston 70 having a stem or rod 71 projecting from one end of the cylinder, and a lever 72 is fulcrumed to one of the studs 4ª of the cylinder 5 and is pivoted at one end to said stem and at the other end is pivoted to the piston rod 16 of the piston 15. As the piston 15 moves inwardly to force the mold section 10 against the mold section 9 the lever 72 moves the closure 70 away from the opening to the pipes 66 and 68 and closes the pipe 69, thereby permitting fluid under pressure to enter the cylinder 2 from the main pressure pipe 22. As the fluid under pressure enters the cylinder 2 it forces the piston 42 upwardly and moves the cores 53 into the molds 19.

The core table 44 and the core plate cap 49 must bind against the bottoms of the mold sections, when the cores are in operative position, with sufficient force to prevent any of the material escaping at the bottom of the molds, but must not bind so tightly as to hinder the movement of the movable mold sections. For the purpose of adjusting the movement of the table with respect to the mold sections, set screws 73 are carried in a flange 74 in the cylinder 2, and are adapted to be adjusted so as to contact the piston 42 and stop its upward movement when the table binds against the mold sections with sufficient force.

For the purpose of feeding the material to the molds 19 a feed block or head 75 is rigidly supported in the casing 1 slightly above the mold sections, and is provided with two longitudinal feed channels 76 from which feed apertures 77, having funnel shaped upper ends, lead downwardly through the block in register with the molds 19. The feed channels 76 open through the end of the casing 1 opposite from the plate 11 into a conveyer tube 78 in which is a screw conveyer 79. The conveyer tube 78 is preferably provided with a steam jacket 78ª to heat the contents of the conveyer. The tube is provided with a hopper 80 into which the material is fed, and the conveyer shaft 81 extends to the outer end of the tube and is provided with a gear 82. A shaft 83 is journaled in bearings 84 on the tube and is provided with a pinion 85 which meshes with the gear 82. The shaft 83 is provided with a fixed pulley 86 and a loose pulley 87.

For the purpose of preventing the material from passing into the molds 19, except when the cores are in operative position, a valve plate 88 is inserted between the block 75 and the mold sections, and is provided with apertures 89 adapted to register with the apertures 77 and molds 19 when the plate is in open position.

For the purpose of operating the valve plate 88 a valve operating cylinder 90 is mounted on the casing 1 above the cylinder 5, and is provided with a piston 91 having a piston rod 92 projecting from the inner end thereof, and a lever 93 is fulcrumed to one of the studs 4ª and is connected at one end to the piston rod 92, and at its other end to the edge of the plate 88 which projects outwardly through the side of the casing 1. When the piston 91 moves toward the outer end of the cylinder 90 it causes the lever 93 to move the valve plate 88 inwardly and bring the apertures 89 into register with the molds 19.

For the purpose of operating the piston 91 a pair of vertically alined valve cylinders 94 and 95 are positioned near the cylinder 90, and a pipe 96 leads from the main pressure pipe 22 and is provided with branch pipes 97 and 98 which open respectively into the lower portion of the cylinder 94 and the upper portion of the cylinder 95. A pipe 99 opens from the cylinder 94 slightly above the pipe 97 and leads to the inner end of the cylinder 90. A pipe 100 leads from the cylinder 95 slightly below the pipe 98 and opens into the outer end of the cylinder 90.

Pipes 101 and 102 lead respectively from the cylinder 94 above the pipe 99, and from the cylinder 95 below the pipe 100 and connect in a pipe 103 which is connected with a pipe 104 leading to the exhaust pipe 30.

In the cylinders 94 and 95 are pistons or valve closures 105 and 106 respectively, which are connected to a piston rod 107, to which are connected links 108 and 109. A push rod 110 is connected to the lower end of the link 109 and extends downwardly through brackets 111 on the casing 1. A guide sleeve 112 is carried on the casing 1 and incloses the joint between the rod 110 and the link 109 when the rod is at the lower limit of its movement. A spring 113 is carried on the rod 110 between the arms of the bracket 111 and its lower end is secured to the rod 110, and it acts to normally hold the rod at its lower limit of movement. On the piston rod 43 is an arm 114 which projects laterally through a slot 115 in the cylinder 2 and casing 1, and carries a plate 116 on its outer end adapted to engage the lower end of the push rod 110 as the piston 43 nears its upper limit of movement, and thereby raise the valve pistons 105 and 106 and open communication from the pipe 97 to pipe 99, and from the pipe 100 to the pipe 102, and cause the piston 91 to move the valve plate 88 to open position. A cord 116ª is attached to the joint between the links 108 and 109 by means of which the joint may be broken when the rod 110 is at the upper limit of its movement to return the pistons 105 and 106 to normal position. The spring 113 will then return the rod 110 to its lower limit of movement and bring the links back into alinement therewith.

After the valve plate 88 has been moved to open position it is necessary to force the material down through the apertures 77 into the mold 19. For this purpose a piston 117 is carried in the cylinder 6 and has piston rod 118 which extends downwardly through the bottom of the cylinder and is provided on its lower end with a compression plate or head 119 adapted to run on vertical guides 120 in the upper portion of the casing 1. Extending downwardly from the head 119 are a plurality of tampers 121 which are arranged in rows longitudinally of the head and project through a plate 122 above the feed block 75 and are in vertical alinement with the apertures 77 in the feed block 75.

For the purpose of operating the piston 117 a pair of horizontally alined valve casings 123 and 124 are mounted above the cylinder 90. A pipe 125 connects in the end of the casing 123 adjacent to the casing 1 and a pipe 126 connects in the outer end of the casing 124. The pipes 125 and 126 are connected in a pipe 127 which connects with the main pressure pipe 22. A pipe 130

128 leads from the casing 124 at a point slightly nearer the casing 1 than the pipe 126 and opens into the cylinder 6 above the piston 117. A pipe 129 leads from the casing 123 at a point slightly nearer the casing 124 than the pipe 125 and connects in the cylinder 6 beneath the piston 117. A pipe 130 leads from the casing 123 at a point nearer the casing 124 than is the pipe 129 and a pipe 131 leads from the casing 124 at a point nearer the casing 123 than is the pipe 128. The pipes 130 and 131 connect in the pipe 104.

Carried in the casings 123 and 124 are pistons or valve closures 132 and 133 respectively which are connected by a piston rod 134. A bell crank lever 135 is pivoted on a bracket 136 which is mounted on the casing 1 and the upper end of said lever is loosely connected to the piston rod 134 and the lower end of the lever is connected to the piston rod 92 of the piston 91.

The operation of the construction shown is as follows: The cores 53 are secured in the core plate 47 and the core plate is placed in position on the table 44. Material is placed in the conveyer tube 78 and the conveyer is set in motion and forces the material into the feed channels 76 and apertures 77, the plate valve 88 being in closed position as shown in Figs. 3 and 4.

The valve pistons or valve closures 37 and 38 being at the right hand limit of their movement fluid under pressure from the main pressure pipe 22 passes through pipes 23, 25, cylinder 27, pipes 31, 32 and 33 into the outer ends of the cylinders 4 and 5 and acts to force the pistons 14 and 15 inwardly and move the mold sections 8 and 10 into close contact with the mold section 9, as shown in Fig. 3. This position of the pistons 37 and 38 permits pressure to escape from the inner ends of the cylinders 4 and 5 through pipes 35, 36, 34, cylinder 26, and pipe 28 into exhaust pipe 30.

As the piston 15 moves inwardly the lever 72 moves the valve piston 70 in the cylinder 67 so as to open communication between the pipes 66 and 68 to permit fluid under pressure to enter the lower end of the cylinder 2 and raise the piston 42 thereby carrying the cores 53 up into the molds 19 and holding the table 44 and mold plate cap 49 firmly against the lower mold sections. As the piston 42 nears its upper limit of movement the arm 114 engages the push rod 110 and raises the valve pistons 105 and 106 so as to open communication between pipes 97 and 99 thereby admitting fluid under pressure into the inner end of the valve operating cylinder 90 and causing the piston 91 to operate the lever 93 in a direction to move the valve plate 88 inwardly to open position. In this position of the valve piston 106 fluid under pressure may escape from the outer end of the cylinder 90 through pipes 100, 102, 103, 104, to the exhaust pipe 30.

The molds 19 are now in condition to receive the material and as the piston 91 was moving outwardly it moved the bell crank lever 135 in a direction to move the pistons 132 and 133 toward the casing 1, thereby opening communication from the main pressure pipe 22 through pipes 127, 126 and 128 into the upper end of the cylinder 6, and open communication from the lower portion of the cylinder 6 through pipes 129, 130 and 104 into the exhaust pipe 30. As fluid under pressure enters the upper portion of the cylinder 6 it forces the piston 117 downwardly, thereby forcing the tampers down into the apertures 77 and compressing the material firmly in the molds 19. The cord 116ª is then pulled to break the joint between the links 108 and 109, and thereby move the valve pistons 105 and 106 back to normal position. Fluid under pressure is now admitted through pipes 98 and 100 to the outer end of the cylinder 90 and the fluid under pressure in the inner end of the cylinder 90 is released through pipes 99, 101, 103, and 104 to the exhaust pipe 30. The admission of fluid under pressure to the outer end of the cylinder 90 causes the piston 91 to move inwardly and move the valve plate 88 back to closed position. At the same time the piston 91 causes the bell-crank lever 135 to reverse the movement of the pistons 132 and 133 and admit fluid under pressure through pipes 127, 125 and 129 into the lower portion of the cylinder 6 and move the piston 117 upwardly and withdraw the tampers 121 from the apertures 77. This position of the valve piston 133 opens communication from the upper end of the cylinder 6 through pipes 128, 131, and 104 to the exhaust pipe 30. The lever 40 is then thrown to the left to move the valve pistons 37 and 38 to a position to admit fluid under pressure through pipes 23, 24, 34, 35 and 36 to the inner ends of the cylinders 4 and 5 and open communication from the outer ends of said cylinders through pipes 32, 33 31 and 29 to the exhaust pipe 30. The admission of fluid under pressure to the inner ends of the cylinders 4 and 5 causes the pistons 14 and 15 to move outwardly and withdraw the mold sections 8 and 10 from the section 9. As the piston 15 moves outwardly it causes the lever 72 to move the valve piston 70 to a position to open communication from the cylinder 2 through pipes 68 and 69 to the exhaust 30 thereby permitting the fluid under pressure in the cylinder 2 to escape and the piston 42 with the core table 44 to fall by gravity and withdraw the cores 53 with the completed receivers (137) from the molds 19. The core plate 47 may now be withdrawn from the core table 44 and the stud bolt 59 is turned in a direction to move the locking bars 51 and 52 to bring the apertures into register with the apertures 54 in the core plate cap 49. The cores 53 with the receivers thereon may then be removed from the core plate and other cores inserted in their stead and the operation repeated.

While but one specific embodiment of the invention has been herein shown and described it will be understood that many details of the construction shown may be varied or omitted without departing from the scope of the claims.

We claim:

1. A molding machine, comprising a sectional mold embracing a fixed mold section and a movable mold section, said fixed mold section being located in alinement with the direction of movement of said movable mold section and the latter being adapted to be moved into contact with the former; the contacting faces of said mold sections being provided with registering mold cavities forming, when said mold sections are in contact, at least one mold chamber, means for moving said movable mold section into and out of contact with said fixed mold section, a feed block mounted in alinement with said mold and provided with feed passages in communication with said mold cavities, means for feeding the material into said feed passages, and means for forcing the material through said feed passages into said mold cavities and compressing the material in the mold cavities; the feed block maintaining its position in alinement with said mold during the forcing of the material through the feed passages and compressing the same in said mold cavities.

2. A machine for molding plastic compound, comprising a sectional mold embracing a fixed central mold section and laterally movable mold sections, said fixed mold section being interposed between said movable mold sections; the latter being adapted to be moved into contact with the former; the contacting faces of said mold sections being provided with registering mold cavities which, when the mold sections are in contact, form the mold chambers, means for moving said movable mold sections into and out of contact with said fixed mold section, a plunger located in alinement with said mold, a feed block interposed between said mold and said plunger, said feed block being provided with feed passages in communication with said mold cavities, said plunger being provided with means for forcing the compound through said feed passages into the mold cavities, means for feeding the compound to said feed passages, and means controlled by the movement of said movable mold sections for operating said plunger.

3. A machine for molding plastic compound, comprising a frame, a sectional mold mounted in said frame and embracing a fixed mold section and movable mold sections; each of said mold sections having registering mold cavities in their contiguous faces, means for moving said movable mold sections into and out of contact with said fixed mold section, means for feeding the compound to the molds, a plunger mounted in the frame above said molds and provided with means adapted to force and compress the compound in said mold cavities, means controlled by the movement of said movable mold sections for operating said plunger, and means interposed between said sectional mold and the plunger and controlled by the movement of said movable mold sections for controlling the admittance of the compound to said mold cavities.

4. A machine for molding plastic compound, comprising a frame, a sectional mold mounted in said frame and embracing fixed and movable mold sections; each of said mold sections having registering mold cavities in their contiguous faces, means for moving said movable mold sections toward and from said fixed mold sections, a feed block mounted in the frame in alinement with the molds and provided with feed passages registering with said mold cavities, means for feeding the compound to the mold, means for forcing the compound through said feed passages and compressing the same in said mold cavities; the feed block maintaining its position in alinement with the mold during the forcing of the material through said feed passages and the compression of the material in said mold cavities, an apertured valve plate interposed between said feed block and said molds, and means for operating said valve plate.

5. A machine for molding plastic compound, comprising a frame, a sectional mold mounted in said frame and embracing a fixed mold section and laterally movable mold sections; each of said mold sections having registering mold cavities in their contiguous faces, means for moving said movable mold sections into and out of contact with said fixed mold section, a feed block in said frame in alinement with said molds and provided with feed passages registering with said mold cavities, means for feeding the compound to said feed passages, means for forcing said compound through said feed passages and into said mold cavities, and means controlled by the movement of said movable mold sections for controlling the admittance of the compound to said mold cavities.

6. A machine for molding plastic compound, comprising a frame, a sectional mold mounted in said frame and embracing fixed and movable mold sections; each of said mold sections having registering mold cavities in their contiguous faces, means for moving said movable mold sections toward and from said fixed mold section, a cylinder in the frame, in alinement with said molds, a piston in said cylinder, a core table having operative connection with said piston, cores mounted on said table, endwise movable bars mounted on said table and provided with locking slots adapted to receive the inner ends of said cores for securing the same to said core table.

7. A machine for molding plastic compound, comprising a section mold, cores having reduced ends, means for moving said cores into and out of said molds including a core table provided with a longitudinally extending channel, a core plate slidably mounted in said channel, a cap plate mounted on said core plate and provided with apertures through which the reduced ends of said cores pass, endwise slidable bars mounted on said core plate beneath said cap plate and provided with locking slots adapted to engage the reduced ends of said cores for securing said cores to the table, and means for imparting endwise movement to said bars.

8. A machine for molding plastic compound, comprising an upright frame, a sectional mold mounted on said frame intermediate the ends thereof and embracing a fixed mold section and horizontally arranged movable mold sections; one on each side of said fixed mold section, means for moving said movable mold sections toward and from said fixed mold section, a feed block mounted in said frame above said mold and provided with feed passages opening into the mold, means for feeding the compound to said feed block, means for forcing the compound through said passages and compressing the compound in said mold, a valve plate interposed between said mold and said feed block for controlling the admittance of the compound to said mold, and means for transmitting movement to said valve plate controlled by the movement of said movable mold sections.

9. A machine for molding plastic compound, comprising an upright frame, a sectional mold mounted in said frame and embracing a fixed mold section and horizontally arranged movable mold sections; each of said mold sections having registering mold cavities in their contiguous faces, cylinders mounted at the sides of said frame, pistons in said cylinders having operative connection with said movable mold sections for moving the latter into and out of contact with said fixed mold section, a core table below said mold having slidable connection with said frame, cores detachably secured to said core table and arranged to enter said mold cavities, a cylinder at the lower end of said frame, a piston in said cylinder having operative connection with said core table for operating the same, means for controlling the movement of said core piston, means for feeding the compound to the mold, endwise movable plungers located above the mold and adapted to compress the compound in said mold cavities, and means for operating said plungers.

10. A machine for molding plastic compound, comprising a sectional mold embracing a fixed mold section and movable mold sections, pressure-operated pistons connected with said movable mold sections, means adapted to admit fluid under pressure to operate said pistons and move said movable mold sections toward and from said fixed mold section, cores for said molds, a pressure-operated piston adapted to move the cores into and out of said molds, means operated by the movement of the mold pistons adapted to automatically operate the core piston, means for feeding the compound to the mold, a valve plate controlling the admittance of the compound to the molds, a pressure-operated piston connected with said valve plate, means operated by the movement of said core piston for automatically operating the valve-operating piston, means for compressing the compound in the mold including a pressure-operated piston, means operated by the movement of the valve-operating piston for automatically operating said compressor piston.

11. A machine for molding plastic compound, comprising a sectional mold, embracing movable mold sections, means for moving the mold sections toward and from each other, cores for the molds, core-operating means controlled by the movement of the mold-operating means adapted to move the cores into and out of the molds, means for feeding the compound to the mold, a valve plate for controlling the admittance of the compound to the molds, a pressure-operated piston connected with said valve plate, controlling valves for the valve-operating piston including a rod provided intermediate its ends with a flexible joint, means carried by the core piston for operating on said rod, and a manually operable means adapted to break said joint.

12. A machine for molding rubber compound, comprising a frame, sectional molds in the frame, means adapted to move the mold sections to and from each other, cores for said molds, automatic core operating means controlled by the movement of the mold operating means and adapted to move the cores to and from the molds, a valve controlling access to the molds, and means operated by the movement of the core operating means adapted to open said valve.

13. A machine for molding rubber compound, comprising a frame, movable mold sections in the frame, pressure operated pistons connected with the mold sections, means adapted to admit pressure to operate the pistons and move the mold sections into contact before the molds are filled and move them out of contact after they are filled, cores for the molds, a pressure operated piston adapted to move the cores into and out of the molds, means operated by the movement of the mold pistons adapted to automatically operate the core piston, means for feeding compound to the molds, a valve controlling access to the molds, and means operated by the core piston for operating said valve.

14. A machine for molding rubber compound, comprising molds, cores for said molds, a pressure operated piston supporting the cores and adapted to move them to and from the molds, means for feeding material to the molds, a valve plate controlling access of material to the molds, a valve operating piston, means connecting the valve piston with the valve plate, controlling valves for the valve operating piston, and means operated by the core piston adapted to operate said controlling valves.

In witness whereof we have hereunto subscribed our names in the presence of two witnesses.

WALTER L. BLAND.
OTIS BLAND.

Witnesses:
W. W. WITHENBURY,
MATIE WITHENBURY.